United States Patent
Takeda et al.

(10) Patent No.: US 7,577,894 B2
(45) Date of Patent: Aug. 18, 2009

(54) APPARATUS AND METHOD FOR JUDGING THE LEGITIMACY OF TRANSFER DATA

(75) Inventors: Yoshihiko Takeda, Kawasaki (JP); Shigeyoshi Ohara, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 330 days.

(21) Appl. No.: 10/929,675

(22) Filed: Aug. 31, 2004

(65) Prior Publication Data

US 2005/0204238 A1   Sep. 15, 2005

(30) Foreign Application Priority Data

Mar. 4, 2004   (JP) ............................. 2004-061087

(51) Int. Cl.
*H03M 13/00* (2006.01)
(52) U.S. Cl. ..................... 714/758; 714/809; 714/819
(58) Field of Classification Search ................. 714/758, 714/819, 807
See application file for complete search history.

(56) References Cited

U.S. PATENT DOCUMENTS

| | | | |
|---|---|---|---|
| 5,168,495 A | 12/1992 | Smith | |
| 5,630,054 A | 5/1997 | Trang | |
| 6,647,528 B1 * | 11/2003 | Collette et al. | ............. 714/758 |
| 7,099,335 B2 | 8/2006 | Namura | |
| 7,174,498 B2 * | 2/2007 | Weissinger | ................. 714/785 |
| 2002/0166090 A1 | 11/2002 | Maeda et al. | |
| 2004/0015691 A1 * | 1/2004 | Collette et al. | ............. 713/161 |

FOREIGN PATENT DOCUMENTS

| | | |
|---|---|---|
| JP | 5-35624 | 2/1993 |
| JP | 5-91072 | 4/1993 |
| JP | 5-120181 | 5/1993 |
| JP | 2000-32004 | 1/2000 |
| JP | 2001-34427 | 2/2001 |
| JP | 2001-144629 | 5/2001 |
| JP | 2002-247097 | 8/2002 |

OTHER PUBLICATIONS

English Translation of Japanese Patent Office Action, mailed Aug. 5, 2008 and issued in a corresponding Japanese Patent Application.

* cited by examiner

*Primary Examiner*—Guy J Lamarre
*Assistant Examiner*—Sam Rizk
(74) *Attorney, Agent, or Firm*—Staas & Halsey LLP

(57) ABSTRACT

When a plurality of data blocks are divided into a plurality of frames and the divided frames are transmitted, every time a frame is received, a interim calculation result of a check code is updated using a transitional calculation result of the check code of the data block corresponding to the frame received and the data included in the frame. When a final calculation result of the check code of a data block is obtained, the calculation result is compared with the check code included in the data block.

10 Claims, 12 Drawing Sheets

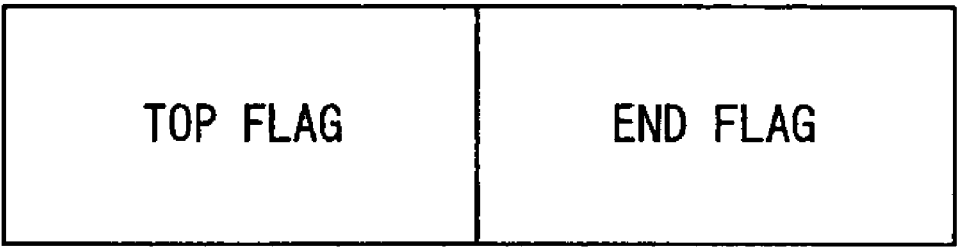
F I G. 4

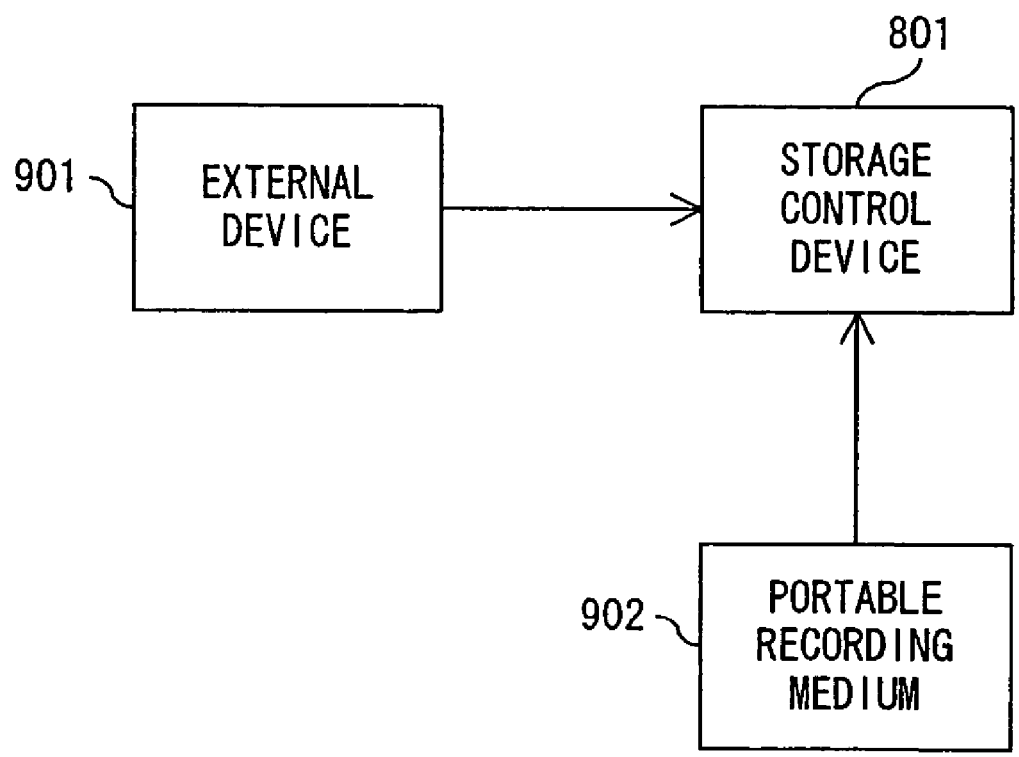
F I G. 9

APPARATUS AND METHOD FOR JUDGING THE LEGITIMACY OF TRANSFER DATA

BACKGROUND OF THE INVENTION

1. Field of the Invention

The present invention relates to the error detection in a data processing system which needs to implement a high-speed transfer of a large volume of data with high reliability, and more specifically to the apparatus and method which judges the legitimacy of the transfer data using a check code in the data processing system in which data and a data block including a check code for the data are divided into a plurality of frames and the divided frames are transmitted.

2. Description of the Related Art

In recent years, the use of fibre channels has become popular as a means for implementing high-speed transfer of a large volume of data between a host computer and a storage apparatus. The storage apparatus comprises a storage device such as a disk device (disk drive) shared by a plurality of host computers and a storage control device which controls data transfer between the host computer and the storage device.

Data in the host computer on the data transmitting side is divided into a plurality of frames of up to 2 k bites. The divided frames are transmitted on the fibre channel link, and are build again to original data by storage apparatus on the data receiving side. At that time, each frame to be transferred is protected from errors by a cyclic redundancy check (CRC), so it is possible to implement data transfer with high reliability.

However, even higher reliability is required for certain uses. To meet such a requirement, the method of protecting the whole data that the host computer prepares with a check code is used in addition to the protection of each frame from errors by CRC.

As the check code, the result obtained by implementing the calculation with an algorithm determined in advance using the data to be protected is used. CRC code is an example of the check codes, and is sometimes used for this particular purpose, but other check codes (other cyclic codes, etc.) are sometimes used for said purpose.

In this protection method, the host computer transmits user data 101 with a check code 102 added as a data block 103, as shown in FIG. 1A. On the fibre channel link, the data block 103 is divided into a plurality of frames 104 (104a, 104b, 104c, 104d), and each frame is protected by CRC and is transferred to the storage control device. Since the check code 102 is usually smaller than the data of a frame, it is contained in the last frame and is transferred.

The storage apparatus performs the CRC of each frame received, and builds each frame back to an original data block 103, and after then implements the calculation of the same algorithm as that the host computer uses to produce the check code 102, for the user data 101. The calculation result obtained thereby should be the same as the check code 102 that the host computer has added, so that the legitimacy of the user data 101 can be judged by comparing the calculation result with the check code 102.

FIG. 1B shows the block diagram of the data processing system which employs such a protection method. The data processing system shown in FIG. 1B comprises one or more host computers 111, a communication network 112, a storage control device 113, and one or more disk devices 114.

The host computer 111 is connected to the storage control device 113 via the communication network 112, and the disk device 114 is connected to the storage control device 113. The storage control device 113 and the disk device 114 constitute the storage apparatus.

The communication network 112 is equipped with switches, for example, in accordance with the link of the fibre channel. In general, a plurality of host computers 111 are connected to the communication network 112.

The storage control device 113 comprises a processor 121, a controller 122, and a data buffer 123, and the controller 122 comprises a check code judgment circuit 131 and a CRC check circuit 132.

The storage control device 113 has interfaces for the host computer 111 and the disk device 114, and receives data from the host computer 111 via the communication network 112.

The frames of the fibre channel comprise a header part, a data part, and a CRC code, as shown in FIG. 1A. The controller 122, when receiving the frames, checks whether there is any error in the frames by the CRC check circuit 132. At the same time, the controller 122 stores the data part of the frame in the data buffer 123, and transfers the header part to the processor 121. Information necessary to specify a part of which data block a frame received is and to build the frame back to original data is included in the header part.

The storage control device 113 repeats this operation and receives one frame after another from the host computer 111. When the whole data block of one piece of user data is stored in the data buffer 123, the processor 121 starts the check code judgment circuit 131.

The check code judgment circuit 131 reads the data block by a specific quantity (for example, 4 bites) from the data buffer 124, and repeats the operation which applies the algorithm determined in the read data, and produces the check code of the data block. Then, the check code judgment circuit 131 judges the validity of the check code obtained and notifies the processor 121 of the judgment result.

<Jpn. unexamined patent application publication No. 2001-144629> discloses apparatus which corrects errors of an optical disk, etc. <<Jpn. unexamined patent application publication No. 5-091072>> discloses method of transferring data between one terminal and another terminal using CRC, <<<Jpn. unexamined patent application publication No. 5-035624>>> discloses radio data transfer using an error correction code, <<<<U.S. Pat. No. 5,630,054>>>> relates to the error judgment of a storage device using CRC.

<Jpn. unexamined patent application publication No. 2001-144629>

<<Jpn. unexamined patent application publication No. 5-091072>>

<<<Jpn. unexamined patent application publication No. 5-035624>>>

<<<<U.S. Pat. No. 5,630,054>>>>

There are the following problems in the conventional check code judgment method described above.

According to the sequence of the conventional check code judgment, after all the frames of the data block in user data are received, the check code judgment circuit is started, and the check codes are judged, so it takes a considerable time until the judgment of the check codes are completed. In order to finish the judgment promptly, it can be considered to start the check code judgment circuit every time a frame is received and calculate the interim result of the data received.

However, on the fibre channel link, it is not that the frames of one piece of user data are transferred continuously, as shown in FIG. 1C but user data from a plurality of host computers is divided into frames and the divided frames are transferred in an interleaving state.

In the example shown in FIG. 1C, data blocks 141a, 141b and 141c from the host computers 111a, 111b and 111c (user data A, B and C) are divided into three frames and the divided frames are transferred to the storage control unit 113. From the data stored in these frames, original user data A, B and C are built and stored in the disk device 114.

In this case, there is an advantage in that if the check code judgment circuit is started every time each frame is received, the judgment of the check code for one piece of user data (for example, user data A) finishes promptly. During that period, however, outstanding user data (for example, user data B and C) cannot be inputted into the check code judgment circuit. Consequently, the judgment of outstanding user data is made to wait until the judgment of preceding user data comes to an end, so this method cannot be a good enough solution to solve the problem.

SUMMARY OF THE INVENTION

The purpose of the present invention is to provide an apparatus and method which shortens the time required for the check code judgment which judges the legitimacy of data transfer in a data processing system in which a plurality of data blocks of user data are divided into a plurality of frames and the divided frames are transmitted.

The first judgment apparatus embodying the present invention comprises a group identifier storage device, an interim result storage device, a production device and a comparison device, and said apparatus judges the legitimacy of the data included in each data block using the check code included in each data block when a plurality of data blocks are divided into a plurality of frames and the divided frames are transmitted.

The group identifier storage device stores a group identifier of the data block corresponding to the frame received among a plurality of group identifiers allocated to a plurality of data blocks. The interim result storage device has a plurality of entries which store the interim calculation results of the check codes in the data blocks in accordance with each group identifier.

The production device produces an interim calculation result of the check code using the interim calculation result stored in the entry of the interim result storage device corresponding to the group identifier stored in the group identifier storage device, and updates the interim calculation result stored in the entry.

When the production device produces the last calculation result of the check code in the data block using the data of the last frame in a data block, the comparison device compares the last calculation result with the check code of the data block and outputs a comparison result.

The processor embodying the present invention judges the legitimacy of the data included in each data block using the check code included in each data block when a plurality of data blocks are divided into a plurality of frames and the divided frames are transmitted. The second judgment apparatus embodying the present invention calculates the check code of each data block while retaining the interim calculation results of the check codes in the data blocks in accordance with each group identifier and compares the check code received with the check code calculated.

The processor stores information of the header part of the frame received in the storage device, analyzes the information and judges whether that frame is the first frame of a data block. If the frame received is the first frame, a new group identifier is allocated to that frame. If the frame received is not the first frame, the same group identifier as that for the received frame which belongs to the same data block as said frame is allocated to said frame, and the allocated group identifier is transferred to the judgment apparatus. Then, the legitimacy of each data block is confirmed based on the comparison result of the check code transferred from the judgment apparatus.

BRIEF DESCRIPTION OF THE DRAWINGS

FIG. 4 shows the flags of the flag register.

FIG. 9 shows the method of providing a program and data.

DESCRIPTION OF THE PREFERRED EMBODIMENTS

Described below are details of the preferred embodiments of the present invention with reference to the accompanying drawings.

Figure 2A:
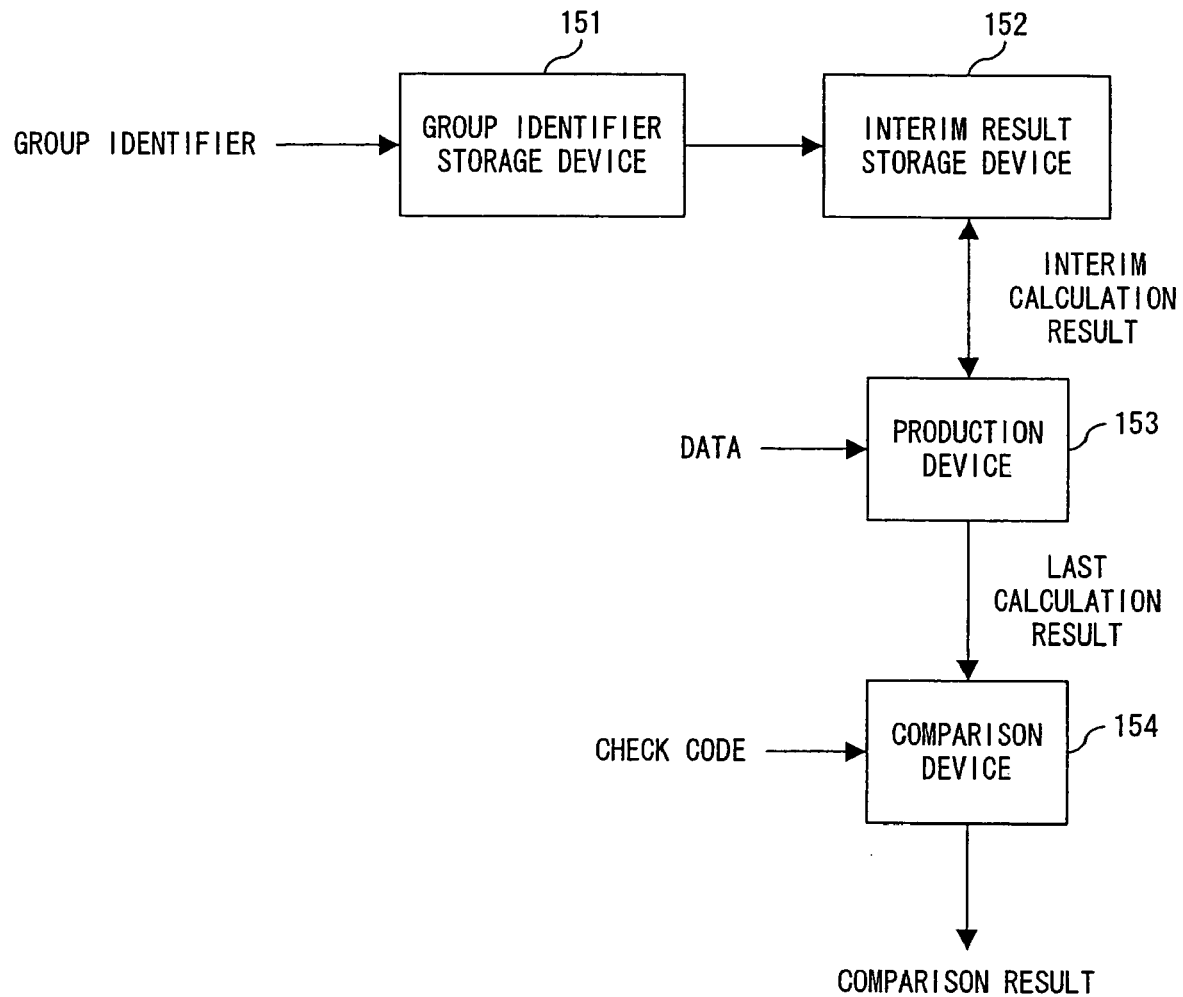
FIG. 2A shows the principle of the judgment apparatus embodying the present invention.

FIG. 2A is a generalized block diagram for the first judgment apparatus embodying the present invention. The judgment apparatus shown in FIG. 2A comprises a group identifier storage device 151, an interim result storage device 152, a production device 153, and a comparison device 154. When a plurality of data blocks are divided into a plurality of frames and the divided frames are transmitted, the judgment apparatus judges the legitimacy of the data included in each data block using the check code included in each data block.

The group identifier storage device 151 stores the group identifier of the data block corresponding to the frame received among a plurality of group identifiers allocated to a plurality of data blocks. The interim result storage device 152 has a plurality of entries which store the interim calculation results of the check codes of the data blocks in accordance with each group identifier.

The production device 153 produces the interim calculation results of the check codes using the interim calculation result stored in the interim calculation result storage device 152 which corresponds to the group identifier stored in the group identifier storage device 151 and the data included in the frame received, and updates the interim calculation results stored in the entries.

When the production device 153 produces the last calculation result of the check code of a data block using the data of the last frame of the data block, the comparison device 154 compares the last calculation result with the check code of the data block and outputs a comparison result.

Every time one frame is received, the group identifier of the data block corresponding to the frame received is stored in the group identifier storage device 151, and the interim calculation result stored in the entry corresponding to the group identifier stored in the group identifier storage device 151 is taken out from the interim result storage device 152. The production device 153 produces the interim calculation result of the check code using the interim calculation result taken out and the data included in the frame received, and updates the interim calculation result stored in the entry.

This operation is repeated for each frame of a plurality of data blocks, and the interim calculation results stored in a plurality of entries which the interim calculation result storage device 152 has are updated in parallel. The production device 153, when receiving the last frame of a data block, produces the last calculation result of the check code using the data of that frame, and the comparison device 154 compares the last calculation result with the check code received and outputs a comparison result.

Thus, the last calculation result of the check code is successively produced from the data block which receives the last frame, and a comparison result is produced. According to such a judgment apparatus, the check codes of a plurality of data blocks are updated in parallel, and when the last frame is received, the check result of the data block can be obtained immediately. Consequently, the check codes of a plurality of user data can be judged in a short time.

Figure 2B:
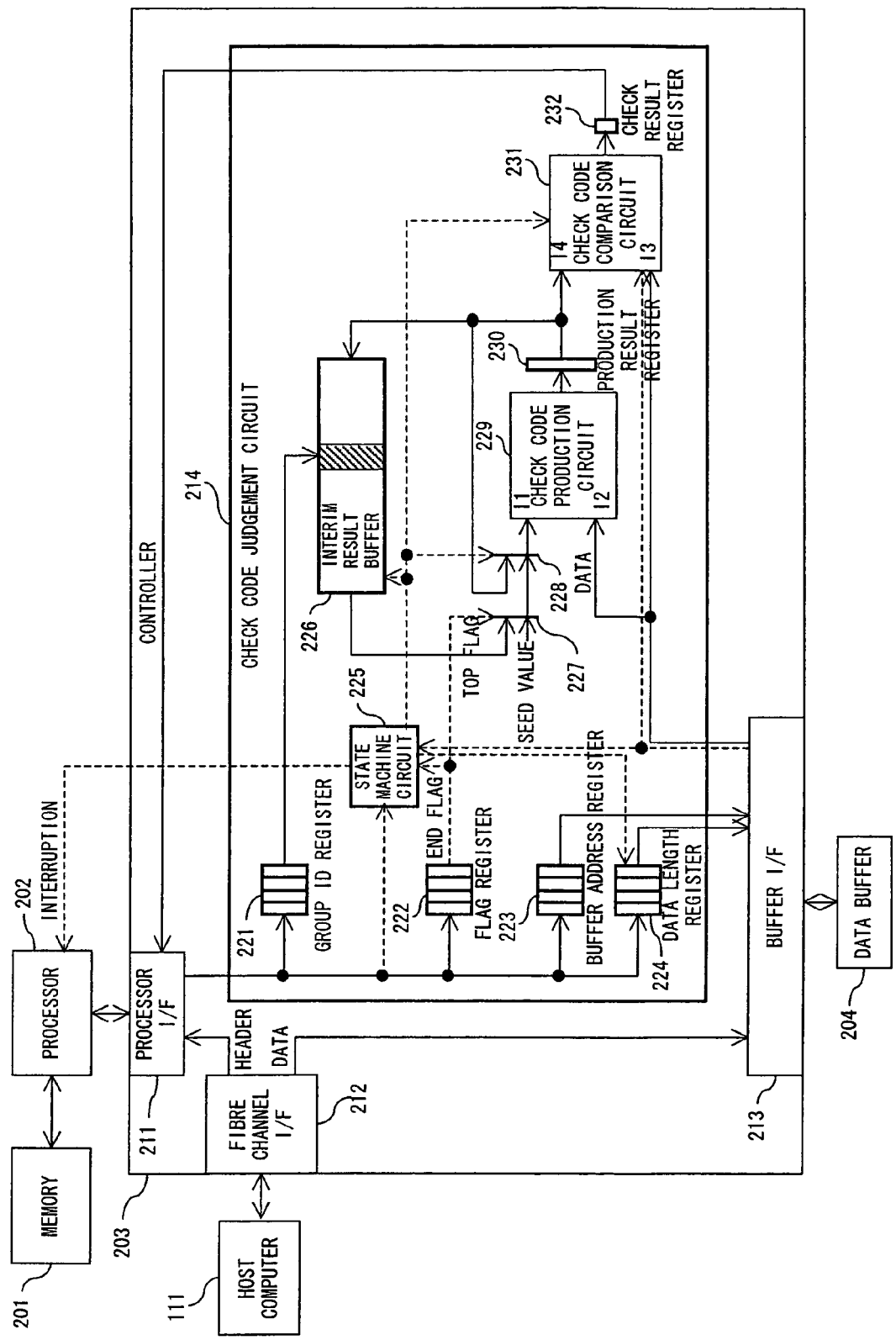
FIG. 2B shows the block diagram of the storage control device.

The group identifier storage device 151, interim result storage device 152, production device 153, and comparison device 154 of the first judgment apparatus correspond to, for example, the check code judgment circuit 214, group ID register 221, interim result buffer 226, check code production circuit 229, and check code comparison circuit 231 respectively shown in FIG. 2B.

The processor embodying the present invention judges the legitimacy of the data included in each data block using the check code included in each data block when a plurality of data blocks are divided into a plurality of frames and the divided frames are transmitted. The second judgment apparatus embodying the present invention calculates the check code of each data block while retaining the interim calculation results of the check codes of the data blocks in accordance with each group identifier and compares the check code received with the check code calculated.

The processor stores information of the header part of the frame received in the storage device, analyzes the information and judges whether that frame is the first frame of a data block. If the frame received is the first frame, a new group identifier is allocated to that frame. If the frame received is not the first frame, the same group identifier as that for the received frame which belongs to the same data block as said frame is allocated to said frame, and the allocated group identifier is transferred to the judgment apparatus. Then, the legitimacy of each data block is confirmed based on the comparison result of the check code transferred from the judgment apparatus.

Since such processing is conducted by the processor, the check codes of a plurality of data blocks can be updated in parallel by the judgment apparatus and the check codes of a plurality of user data can be judged in a short time.

The second judgment apparatus and the storage device correspond to, for example, the check code judgment circuit 214 and the memory 201 respectively shown in FIG. 2B.

According to the present invention, the check codes of a plurality user data can be judged in parallel by a check code judgment circuit, and the judgment time can be shortened by a comparatively small quantity of hardware.

FIG. 2B shows the block diagram of the storage control device. In FIG. 2B, the solid-line arrow between a bock and another block indicates the transfer of a data signal, and the broken-line arrow indicates the transfer of a control signal.

The storage control device shown in FIG. 2B comprises a memory 201, a processor 202, a controller 203, and a data buffer 204. The controller 203 comprises a processor interface (processor I/F) 211, a fibre channel interface (fibre channel I/F) 212, a buffer interface (buffer I/F) 213, and a check code judgment circuit 214. The CRC check circuit in the controller 203 is omitted in FIG. 2B.

The controller 203 is connected to the processor 202 by the process interface 211, to the host computer 111 by the fibre channel interface 212, and to the data buffer 204 by the buffer interface 213. The controller 203, when receiving a frame from the host computer 111, stores the data part in the data buffer 204, and transfers the address of the data buffer 204 which stores the header part and the data to the processor 202.

The memory 201 includes, for example, RAM (random access memory), etc. and stores the program and data which the processor 20 uses. The processor 202 implements the following processing by using the memory 201 and executing the program.

The processor 202 analyzes the header part received from the controller 203 and judges to which part of which data block the frame received corresponds as well as the length of the data. If the frame received is the first frame of a data block, a new group identifier (group ID) is allocated to that frame. If the frame received is not the first frame of a data block, the same group ID as that for the frame which has already been received and which constitutes the same data block is allocated to that frame.

After then, the processor 202 starts the check code judgment circuit 214 to judge the check codes of the frames received. At that time, the following information necessary to judge the check codes is transferred to the controller 203.

Address in which data of the frame received is stored in the data buffer 204

Data length of the data which is inputted to the check code judgment circuit 214

Flag indicating the first and the last of user data

Group ID indicating to which data block the data of the frame received belongs

The check code judgment circuit 214 comprises a group ID register 221, flag register 222, buffer address register 223, data length register 224, state machine circuit 225, interim result buffer 226, multiplexer 227 and 228, check code production circuit 229, production result register 230, check code comparison circuit 231, and check result register 232.

The group ID register 221, flag register 222, buffer address register 223, and data length register 224 store the group ID, flag, address of data, and data length respectively which are transferred from the processor 202.

The check code production circuit 229 calculates a check code from the initial value of the length determined in advance and the data of an arbitrary length based on a given algorithm. The production result register 230 stores the calculation result outputted from the check code production circuit 229, and the interim result buffer 226 stores the interim calculation result of a check code in accordance with each group ID. The multiplexer 227 and 228 selects either of the seed value determined in advance, the entry of the interim result buffer 226, or the output of the production result register 230 to input an initial value of the check code production circuit 229.

The check code comparison circuit 231 judges whether the calculated check code and the check code stored in the data buffer 204 agree, and the check result register 232 stores the judgment result outputted from the check code comparison circuit 231. This judgment result is transferred to the processor 202 via the processor interface 211. The state machine circuit 225 is started by the instruction from the processor 202 and controls the operation of the whole of the check code judgment circuit 214.

The processor 202 notifies the check code judgment circuit 214 of the group ID of each frame, and the check code judgment circuit 214 stores the interim calculation result of a check code in the interim result buffer 226 in accordance with each group ID and uses the stored interim calculation result as an initial value when calculating the rest continuously. This operation makes it possible to judge check codes of a plurality of user data in parallel every time the processor 202 receives a frame even if the processor 202 receives a plurality of user data divided into a plurality of frames. Thus, the time required for the judgment can be shortened.

The check code judgment circuit 214 reads the first word of data from the address of the data buffer 204 stored in the buffer address register 223 and inputs the first word of data to the port I2 of the check code production circuit 229, and at the same time inputs an initial value for producing a check code to the port I1.

A seed value determined in advance is used as the initial value of the check code production circuit 229 if the frame received is the first frame of a data block. If the frame received is not the first frame of a data block, the value of an entry of the interim result buffer 226 corresponding to the group ID of the group ID register 221 is used. Which part of a data block the frame received corresponds to is judged using the flag of the flag register 222.

The check code production circuit 229 outputs the calculation result of a check code to the production result register 230. The check code judgment circuit 214 continuously reads the second word from the address of the data buffer 204 and inputs the second word to the port I2 of the check code production circuit 229, and at the same time inputs the output value of the production result register 230 to the port I1. This operation is repeated up to the data of the length instructed by the processor 202.

The check code judgment circuit 214 reads the check code received from the data buffer 204 if the frame received is the last frame of a data block. The check code comparison circuit 231 compares the read check code with the calculation result of the check code which the check code production circuit 229 finally produces in the above sequence. If the two check codes agree, the legitimacy of the data block received can be confirmed.

If the frame received is not the last frame of a data block, the check code production circuit 229 stores the interim calculation result of the check code which the check code production circuit 229 produces to the entry of the interim result buffer 226 corresponding to the group ID of the group ID register 221.

Figure 3:
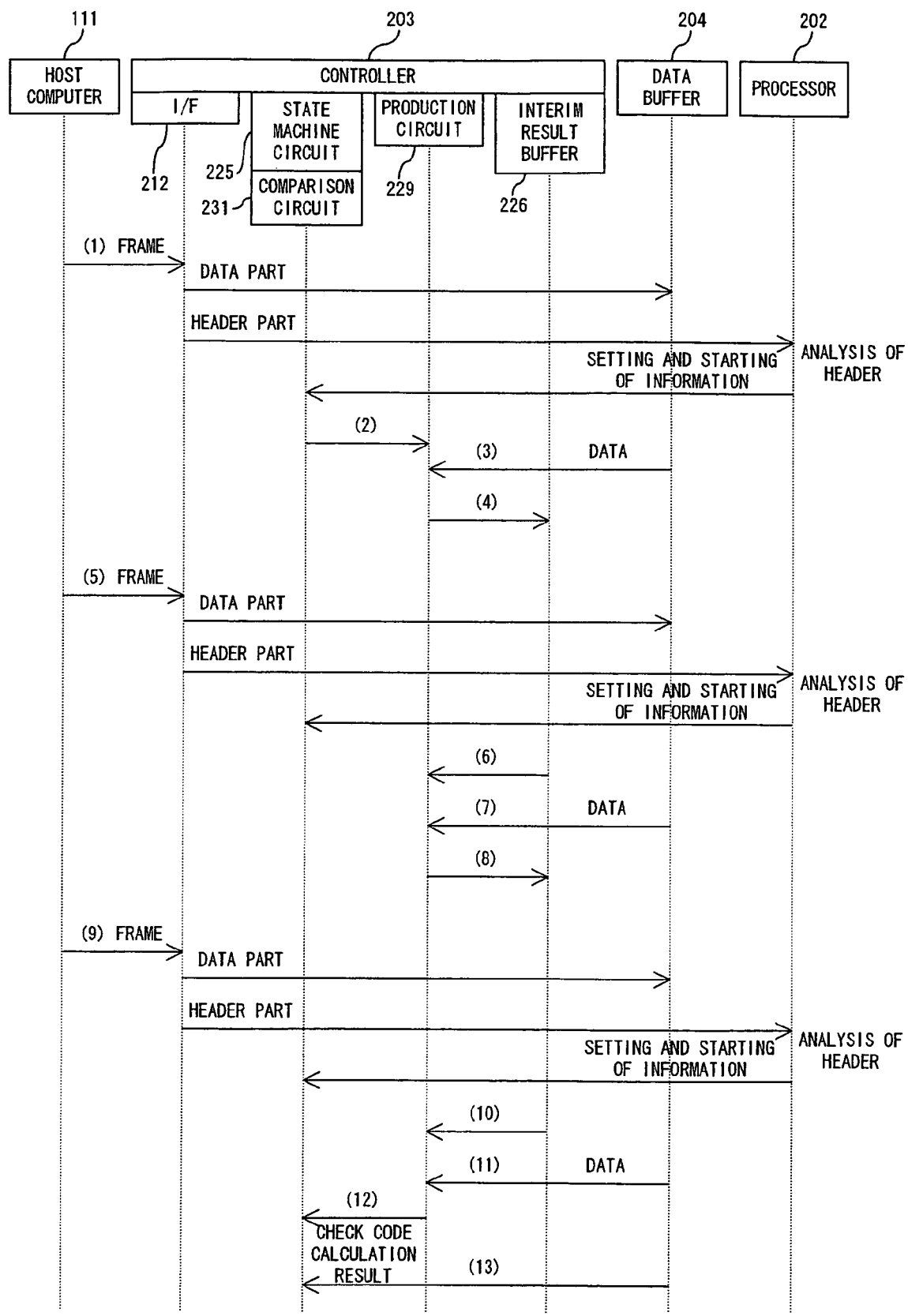
FIG. 3 shows the operation sequence of the storage control device.

FIG. 3 shows an example of the operation sequence of the storage control device of FIG. 2B. In this example, one data block is divided into three frames and the three divided frames are transferred from the host computer 111. The processor 202 analyzes the header parts of these three frames and judges that they are the constituents of the same data block, so the same group ID is allocated to the three frames. The operation sequence shown in FIG. 3 is as follows.

(1) Immediately after the first frame is received, the state machine circuit 225 in the check code judgment circuit 214 is started from the processor 202.

(2) The state machine circuit 225 gives the seed value determined in advance to the check code production circuit 229 as an initial value.

(3) The check code production circuit 229 calculates the check code of the data read from the data buffer 204.

(4) The check code production circuit 229, when finishing the calculation of the data instructed, stores the calculation result in the entry corresponding to the group ID of the interim result buffer 226.

(5) After the second frame is received, the state machine circuit 225 is started from the processor 202.

(6) The state machine circuit 225 gives the value read from the entry corresponding to the group ID of the interim result buffer 226 to the check code production circuit 229 as an initial value.

(7) The check code production circuit 229 calculates the check code of the data read from the data buffer 204.

(8) The check code production circuit 229, when finishing the calculation of the data instructed, stores the calculation result in the entry corresponding to the group ID of the interim result buffer 226.

(9) After the third frame is received, the state machine circuit 225 is started from the processor.

(10) The state machine circuit 225 gives the value read from the entry corresponding to the group ID of the interim result buffer 226 to the check code production circuit 229 as an initial value.

(11) The check code production circuit 229 calculates the check code of the data read from the data buffer 204.

(12) The check code production circuit 229, when finishing the calculation of the data instructed, outputs the calculation result to the check code comparison circuit 231.

(13) The check code comparison circuit 231 reads the check code part from the data buffer 204 and compares the check code part with the check code calculated.

Next, described below are details of the operation of the storage control device shown in FIG. 2B with reference to FIG. 4 to FIG. 7.

FIG. 4 shows the top flag and end flag stored in the flag register 222. These flags are indicated by information of one bit. When the top flag is on (logic "1"), that indicates that the frame received is the first frame of a data block, and when the end flag is on, that indicates that the frame received is the last frame of a data block. When no flag is on, that indicates that the frame received is a transitional frame, not the first frame, nor the last frame, and when both flags are on, that indicates that the frame received is the first and last frame.

When the top flag of the flag register 222 is logic "0," the multiplexer 227 selects the data outputted from the entry of the interim result buffer 226 corresponding to the group ID of the group ID register 221, and when the top flag is logic "1," the multiplexer 227 selects a seed value and outputs the selected data to the multiplexer 228.

Figure 5:
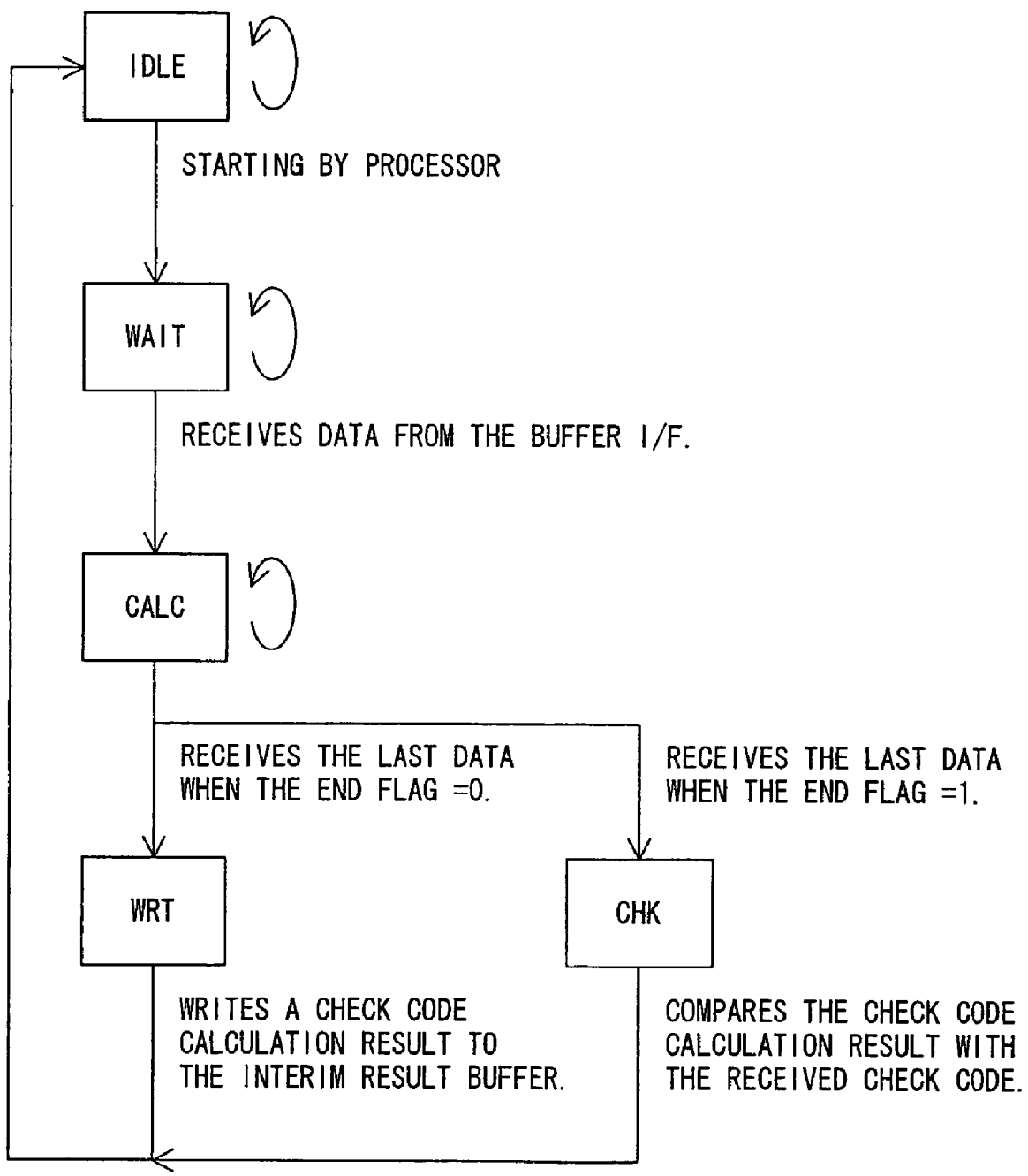
FIG. 5 shows the state transition of the state machine circuit.

FIG. 5 shows the state transition of the state machine circuit 225. The state machine circuit 225, when being started by the processor 202, changes from an idle state (IDLE) to a waiting state (WAIT), and when the check code production circuit 214 receives data from the buffer interface 213, the state machine circuit 225 changes from the WAIT state to a calculation state (CALC). Then, the state machine circuit 225 starts the control necessary to calculate a check code.

The state machine circuit 225 outputs, in the WAIT state, such a control signal that the multiplexer 228 selects the output of the multiplexer 227, and the state machine circuit 225 outputs, in the CALC state, such a control signal that the multiplexer 228 selects the output of the production result register 230.

When the state machine circuit 225 receives the last word of a frame from the buffer interface 213 in the CALC state when the end flag of the flag register 222 is logic "0," the state machine circuit 225 changes to a write state (WRT). Then, the state machine circuit 225 outputs a write effective signal to the interim result buffer 226, and controls the writing of the calculation result of the production result register 230 to the interim result buffer 226.

When the state machine circuit 225 receives the last word of a frame in the CALC state when the end flag of the flag register 222 is logic "1", the state machine circuit 225 changes to a check state (CHK) and controls the comparison of the calculation result with the received check code. When the state machine circuit 225 finishes the control of the WRT state or the CHK state, the state machine circuit 225 changes to the IDLE state.

Figure 6:
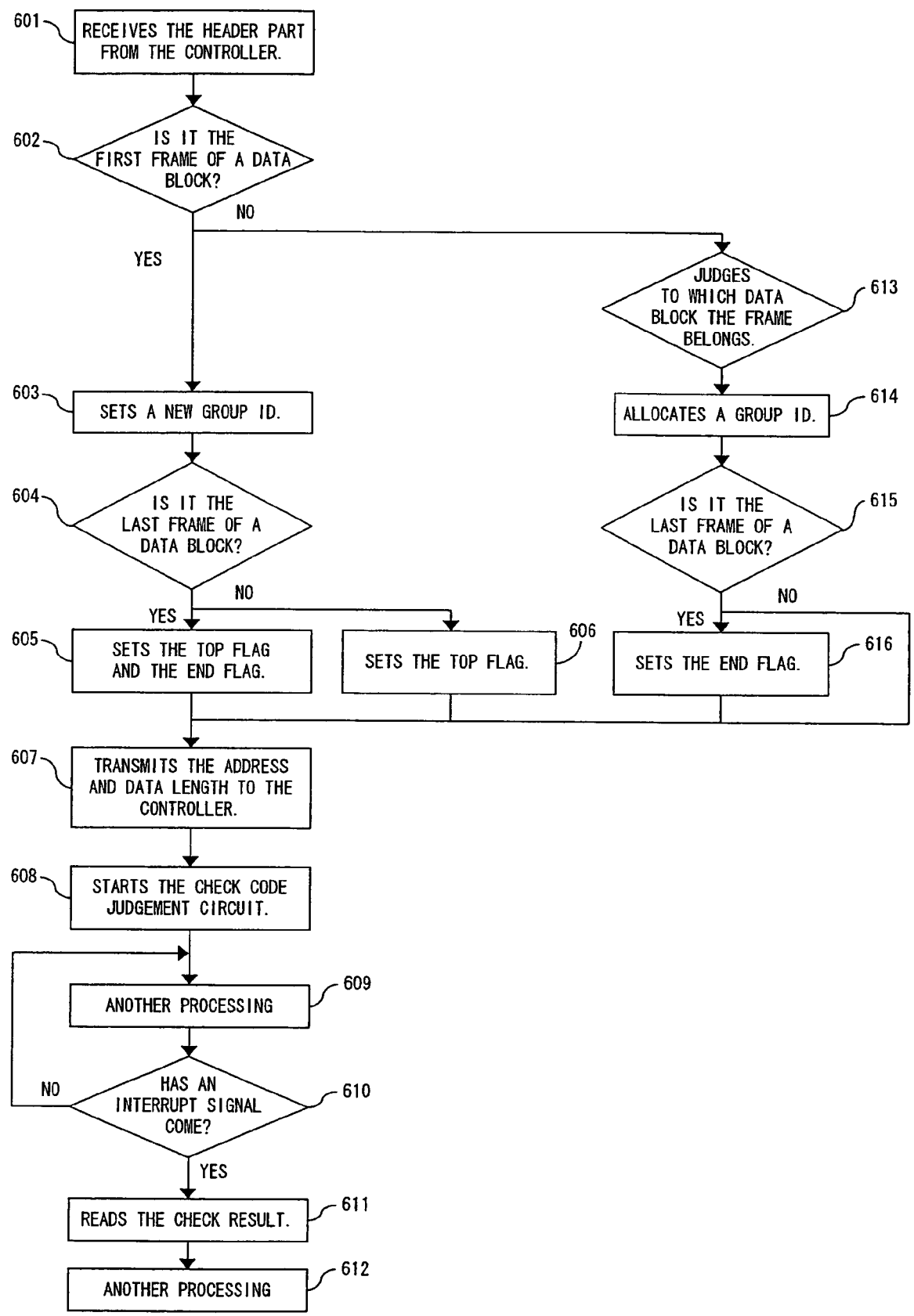
FIG. 6 is a flowchart of the processing of the processor.

FIG. 6 is a flowchart of the processing which the processor 202 implements. The processor 202 stores the information of the header part received from the controller 203 in the memory 201 and analyzes the information (Step 601). Then, the processor 202 judges whether the frame received from the host computer 111 is the first frame of a data block (Step 602).

If the frame received is the first frame of a data block, the processor 202 allocates a new group ID to that frame (Step 603), and judges whether that frame is the last frame of a data block (Step 604). If the frame received is the last frame of a data block, that frame is the first and last frame of the data block, so the processor 202 sets logic "1" to the top flag and the end flag (Step 605). If the frame received is not the last frame, the processor 202 sets logic "1" and logic "0" to the top flag and the end flag respectively (Step 606).

Then, the processor 202 sets the address of data and the length of data and transmits the group ID, the top flag, and the end flag to the controller 203 (Step 607), and starts the check code judgment circuit 214 (Step 608).

Then, the processor 202 implements another processing until it receives an interrupt signal from the controller 203 (Step 609). The processor 202, when receiving an interrupt signal from the controller 203, reads the check result from the check code judgment circuit 214 and confirms the legitimacy of the data block received (Step 611), and implements another processing (Step 612).

In Step 602, if the frame received is not the first frame, that frame corresponds to the succeeding data of any frame which has already been received. The processor 202 judges to which data block that frame belongs (Step 613) and allocates the same group ID as that for the corresponding frame which has already been received to the frame received (Step 614).

Then, the processor 202 judges whether that frame is the last frame of a data block (Step 615). If the frame received is the last frame, the processor 202 sets logic "0" and logic "1" to the top flag and the end flag respectively (Step 616). If the frame received is not the last frame, the processor 202 sets logic "0" to the top flag and the end flag. Then, the processor 202 implements the processing of Step 607 and onward.

In order to manage the relationship between a data block and a group ID, for example, a table which retains the relationship between an identifier for each of user data and each group ID is provided in the memory 201, and the processor 202 registers the data identifier and group ID of the frame received in the table. In Step 614, the processor 202 obtains the group ID corresponding to the data identifier of the frame which is newly received from the table and allocates said group ID to that frame.

Figure 7:
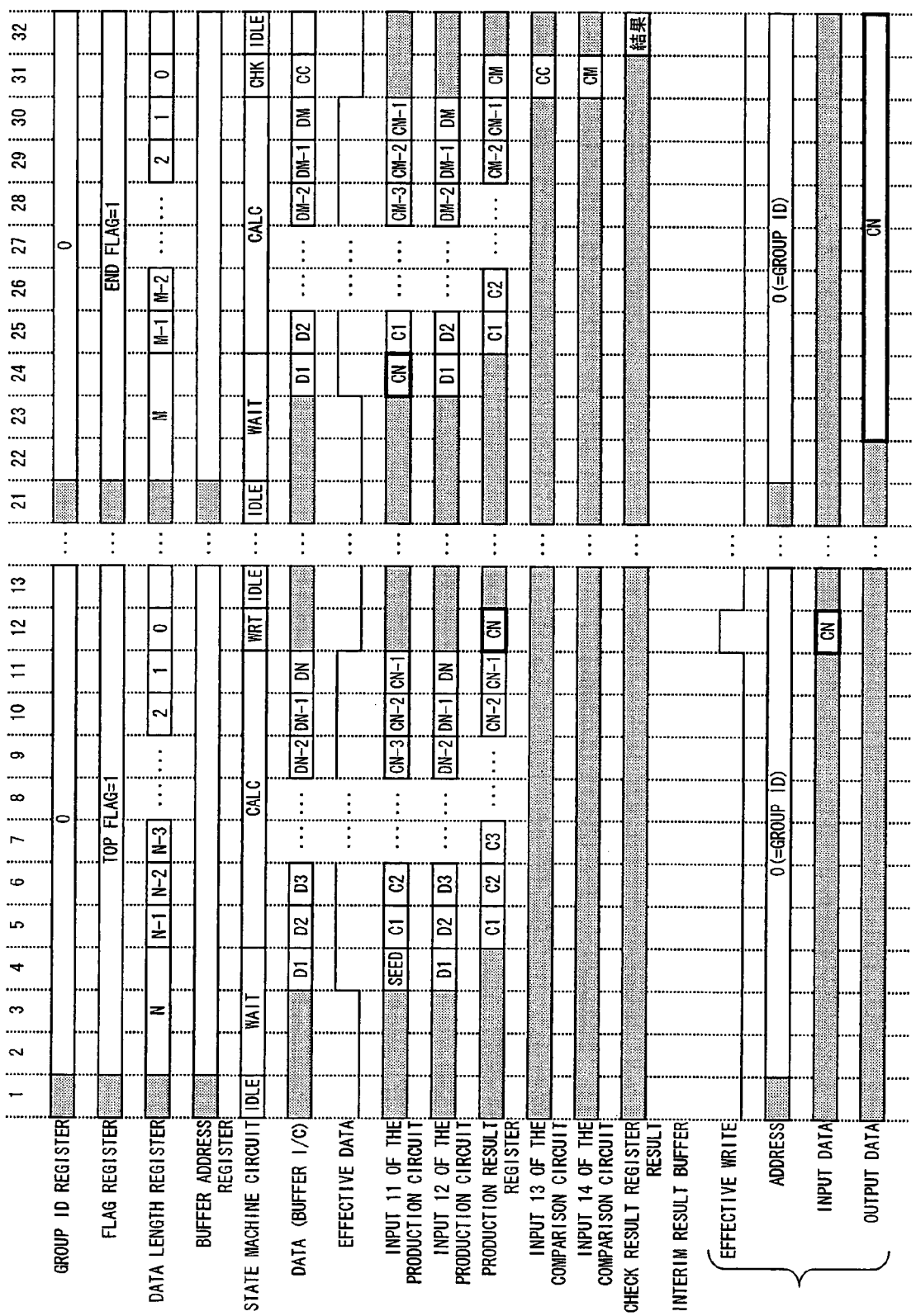
FIG. 7 shows the operation timing chart of the check code judgment circuit.

FIG. 7 shows an example of the operation timing chart of the check code judgment circuit 214. The figures in the upper end indicate a clock cycle, and cycle 1 to cycle 13 indicate the data processing of the first frame of a data block, while cycle 21 to 32 indicate the data processing of the last frame of a data block. The state machine circuit 225 decrements the value of the data length register 224 in accordance with each cycle when the calculation of a check code is begun.

The data effective signal is a control signal outputted to the state machine circuit 225 and the check code comparison circuit 231 via the data buffer 204 through the buffer interface 213. The write effective signal is a control signal outputted from the state machine circuit 225 to the interim result buffer 226. Described below is the operation of the check code judgment circuit 214 with reference to cycle numbers.

Cycle 1

When the controller 203 receives the first frame, the processor 202 sets the group ID, flag, data length, and address, and starts the check code judgment circuit 214. The group ID is set to 0; the top flag to logic "1"; the end flag to logic "0"; and the data length to N. Thus, the state machine circuit 225 changes from the IDLE state to the WAIT state.

Cycle 4

The first data "D1" is read from the data buffer 204 via the buffer interface 213 and is inputted to the port I2 of the check code production circuit 229. At that time, since the top flag is logic "1," the multiplexer 227 selects a seed value, and since the state machine circuit 225 is in the WAIT state, the multiplexer 228 selects the output of the multiplexer 227. Consequently, the seed value is inputted to the port I1 of the check code production circuit 229. The state machine circuit 225 changes from the WAIT state to the CALC state, and the value of the data length register 224 is decremented by 1.

Cycle 5

"C1" i.e. the value obtained from the data inputted to the check code production circuit 229 in Cycle 4 is stored in the production result register 230. The second data "D2" is read from the data buffer 204 and is inputted to the port I2 of the check code production circuit 229. At that time, since the state machine circuit 225 is in the CALC state, the multiplexer 228 selects the output of the production result register 230, and "C1" is inputted to the port I1 of the check code production circuit 229. The value of the data length register 224 is decremented by 1.

Cycles 6 to 10

The same operation as Cycle 5 is repeated, and the value of the production result register 230 is successively updated.

Cycle 11

"CN−1" i.e. the value outputted from the check code production circuit 229 is stored in the production result register 230, and is inputted to the port I1 of the check code production circuit 229. Data "DN" is read from the data buffer 204 and is inputted to the port I2 of the check code production circuit 229. The value of the data length register 224 is 1, and if the value is decremented, the value becomes 0, so "DN" is judged to be the last data. At that time, since the end flag is logic "0," the state machine circuit 225 changes from the CALC state to the WRT state.

Cycle 12

"CN" i.e. the value outputted from the check code production circuit 229 is stored in the production result register 230 as the calculation result of the check code for the first frame. The write effective signal is outputted from the state machine circuit 225, and the value "CN" of the production result register 230 is stored in the interim result buffer 226 as an interim calculation result. At that time, "CN" is written to the entry of address "0" indicated by the group ID of the group ID register 221.

After then, the check code judgment circuit 214 is started every time the controller 203 receives a next frame, and the value of "CN" stored in address "0" of the interim result buffer 226 is updated.

Cycle 21

When the controller 203 receives the last frame, the processor 202 sets the group ID, flag, data length and address, and starts the check code judgment circuit 214. The group ID is set to 0; the top flag to logic "0"; the end flag to logic "1"; and the data length to M. Thus, the state machine circuit 225 changes from the IDLE state to the WAIT state.

Cycle 24

The first data "D1" is read from the data buffer 204, and is inputted to the port I2 of the check code production circuit 229. At that time, since the top flag is logic "0," the multiplexer 227 selects the output of the interim result buffer 226, and since the state machine circuit 225 is in the WAIT state, the multiplexer 228 selects the output of the multiplexer 227. Consequently, "CN" or the data of address "0" of the interim result buffer 226 is inputted to the port I1 of the check code production circuit 229. The state machine circuit 225 changes from the WAIT state to the CALC state, and the value of the data length register 224 is decremented by 1.

Cycles 25 to 29

The same operation as cycle 5 is repeated, and the value of the production result register 230 is successively updated.

Cycle 30

"CM−1" or the value outputted from the check code production circuit 229 is stored in the production result register 230 and is inputted to the port I1 of the check code production circuit 229. Data "DM" is read from the data buffer 204 and is inputted to the port I2 of the check code production circuit 229. Since the value of the data length register 224 is "1," "DM" is judged to be the last data. At this time, since the end flag is logic "1," the state machine circuit 225 changes from the CALC state to the CHK state.

Cycle 31

The value "CM" outputted from the check code production circuit 229 is stored in the production result register 230 as the calculation result of the check code for the last frame. This "CM" is the calculation result of the check code for the whole data of group ID "0" and is inputted to the port I4 of the check code comparison circuit 231. Also, check code "CC" which follows the data of the last frame is read from the data buffer 204 and is inputted to the port I3 of the check code comparison circuit 231.

Cycle 32

The check code comparison circuit 231 compares the calculation result "CM" with the check code "CC" in accordance with the control signal from the state machine circuit 225 and writes the result in the check result register 232 as a check result.

After then, the state machine circuit 225 transmits an interrupt signal to the processor 202, and the processor 202 reads the check result of the check result register 232 and confirms the legitimacy of the data block.

In FIG. 3, frames constituting a data block are continuously transferred from the host computer 111. In FIG. 7, only the processing of the first frame and the last frame of a data block is shown, but actually, a frame constituting another data block sometimes enters between the first frame and the last frame. Even in that case, another group ID is allocated to another data block, and the calculation result of the check code of that frame is stored in another entry of interim result buffer 226, so that the check codes of a plurality of data blocks can be judged in parallel.

Figure 8:
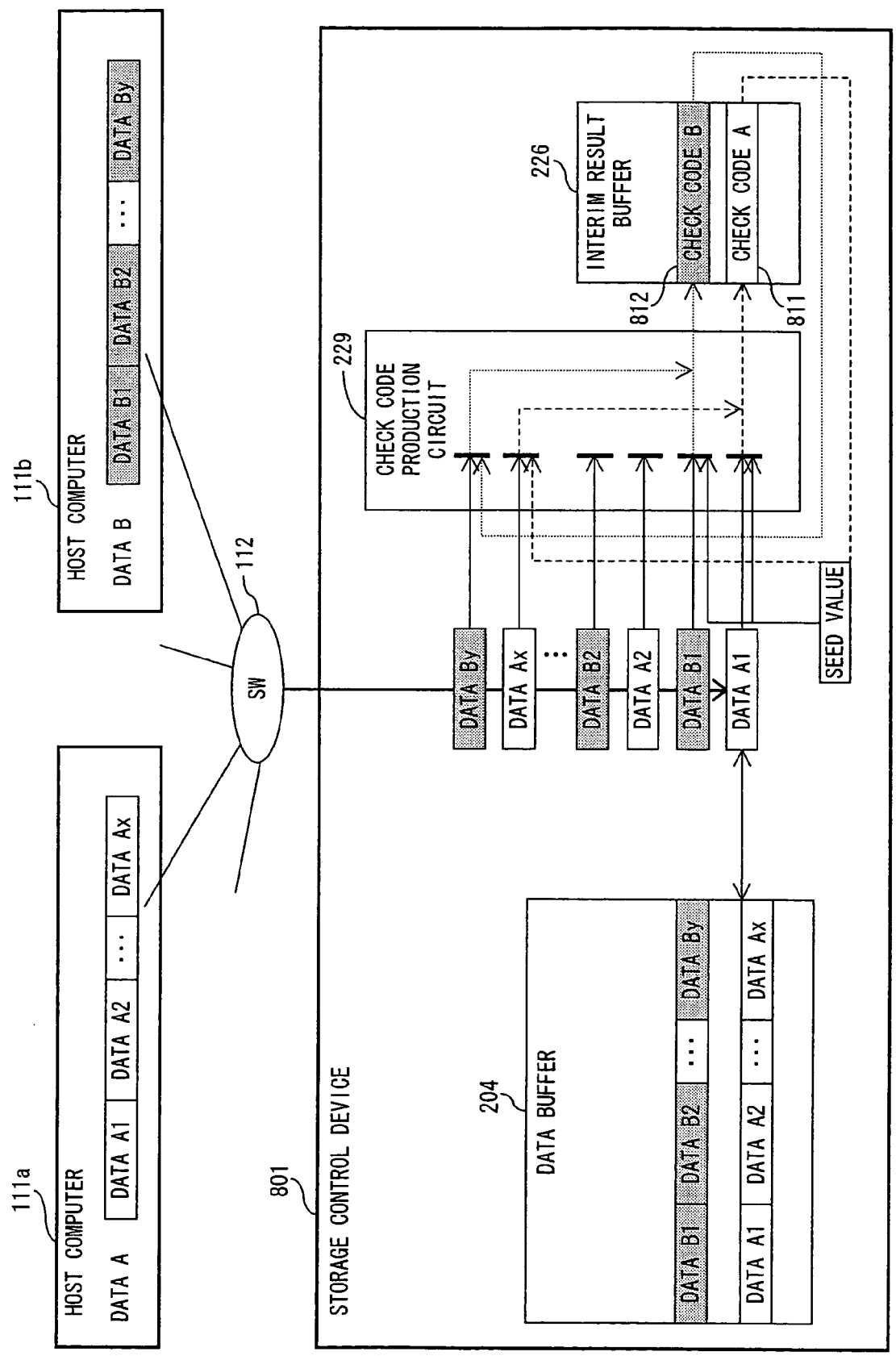
FIG. 8 shows the check code judgment of a plurality of user data.

FIG. 8 shows an example of the check code judgment in such a case. In this example, the data blocks of user data A and user data B from the host computers 111a and 111b are divided into a plurality frames and the divided frames are transferred to the storage control device 801.

User data A comprises data A1, data A2, . . . , data Ax, and data B comprises data B1, data B2, . . . , data By. Each of data is contained in a separate frame and is transferred. The storage control device 801 has such a configuration as shown in FIG. 2B and receives frames in the order of data A1, data B1, data A2, data B2, . . . , data Ax and data By.

The data of the frames received is once stored in the data buffer 204 and is successively read from the data buffer 204 by the check code judgment circuit 214. The check code production circuit 229, first, calculates check code A from data A1 and the seed value and stores check code A as an interim calculation result in the entry 811 corresponding to the interim result buffer 226. Then, the check code production circuit 229 calculates check code B from data B1 and the seed value and stores check code B as an interim calculation result in the entry 812 corresponding to the interim result buffer 226.

Then, the check code production circuit 229 calculates a check code from data A2 and the check code A of the entry 811 and updates check code A of the entry 811. Also, the check code production circuit 229 calculates a check code from data B2 and the check code B of the entry 812 and updates check code B of the entry 812.

When such an updating operation is repeated and data Ax is inputted to the check code production circuit 229, the check codes for the whole of user data A are outputted to the check code comparison circuit 231. When data By is inputted to the check code production circuit 229, the check codes for the whole of user data B are outputted to the check code comparison circuit 231.

FIG. 9 shows the method of providing a program and data which the processor 202 uses for processing. The program and data stored in the external device 901 of an information processing device, etc. and the portable recording medium 902 are loaded in the memory 201 in the storage control device 801. The external device 901 produces a carrier signal for conveying the program and data and transmits it to the storage control device 801 via an arbitrary transmission medium on a communication network. The portable recording medium 902 is an arbitrary computer readable recording medium such as a memory card, flexible disk, optical disk, magneto-optical disk or the like. The processor 202 executes the program using the data to implement any necessary processing.

Figure 1A:
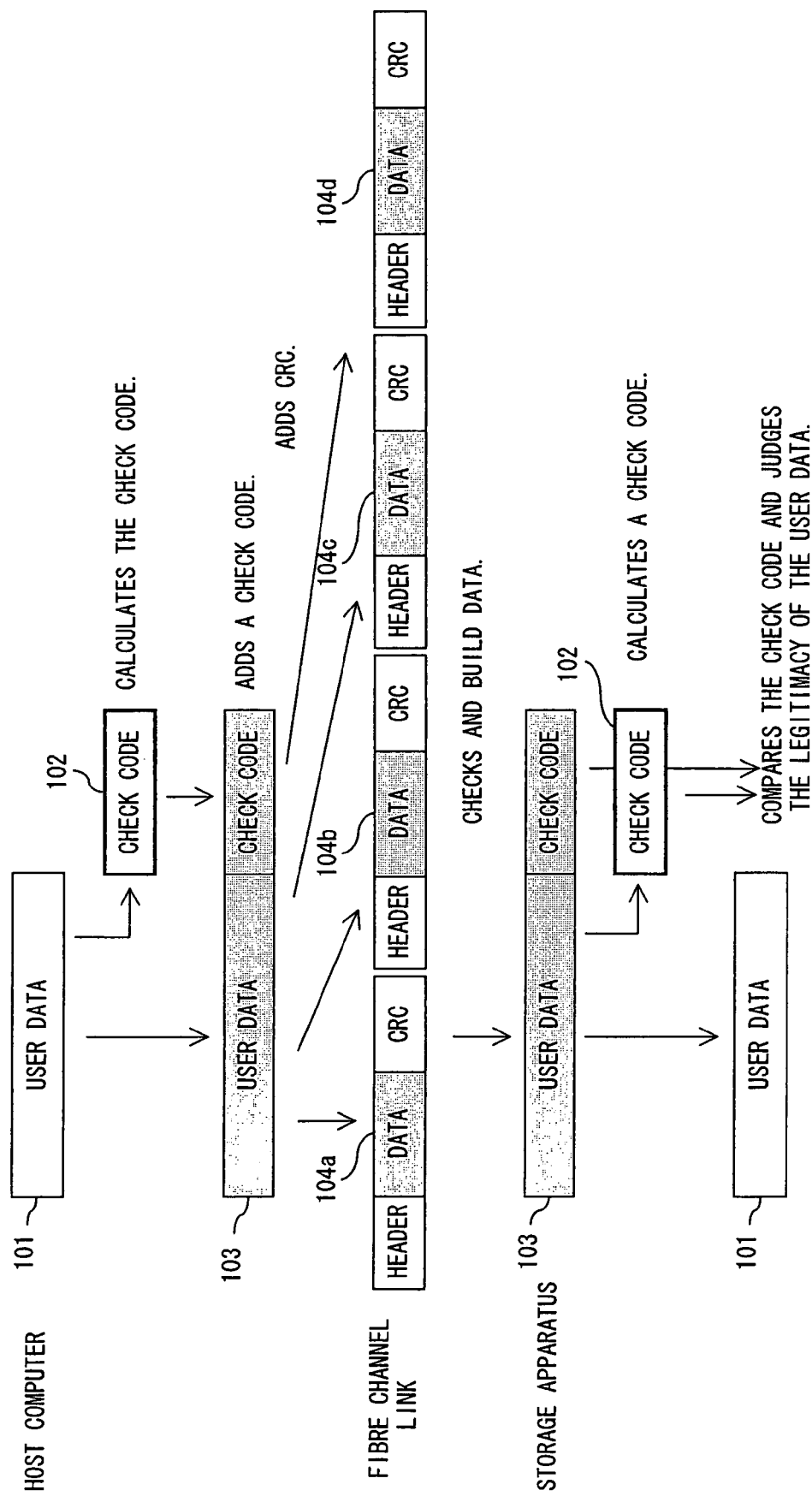
FIG. 1A is the diagram showing the protection of data by a check code.
Figure 1B:
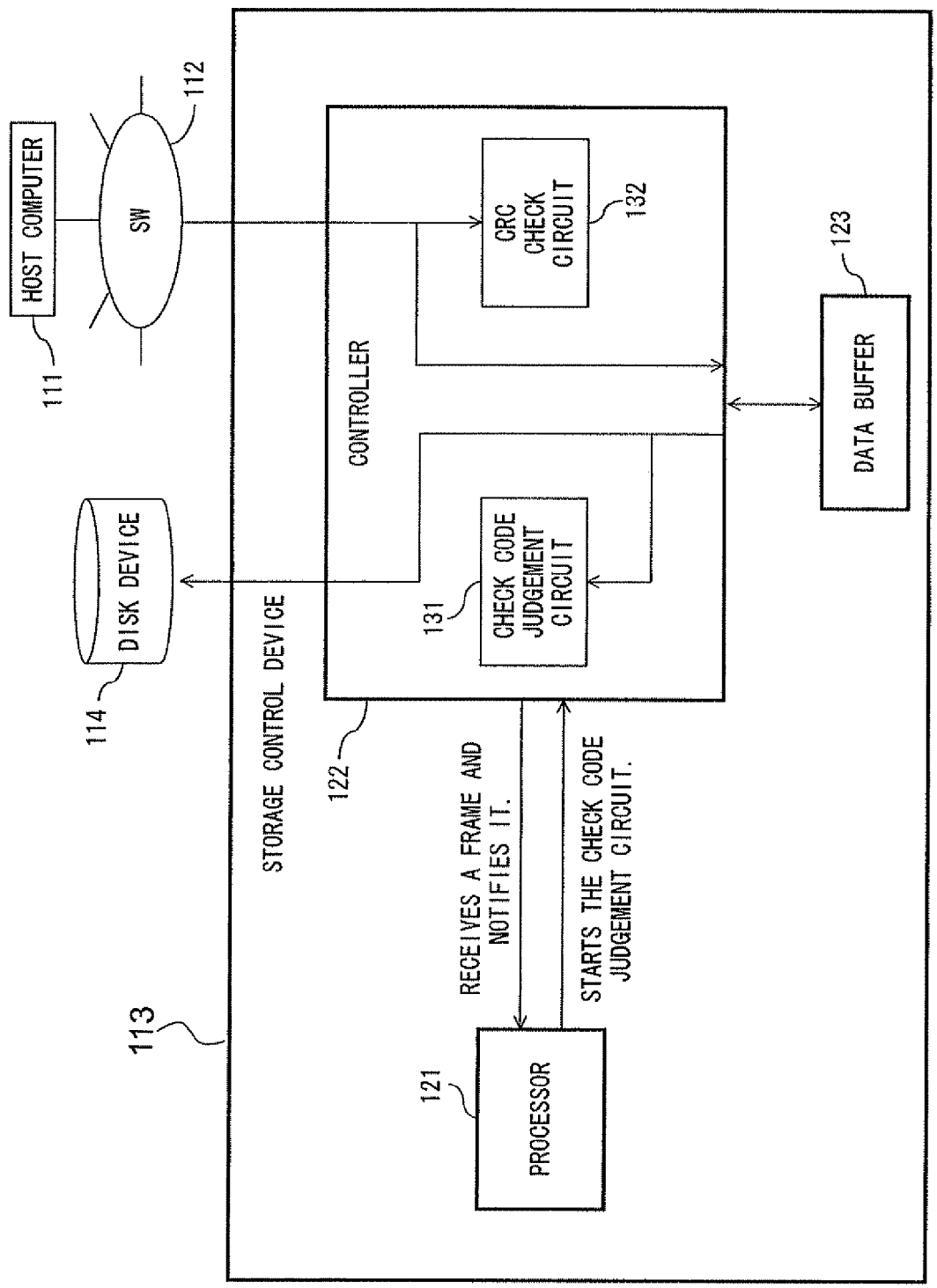
FIG. 1B shows the block diagram of the data processing system.
Figure 1C:
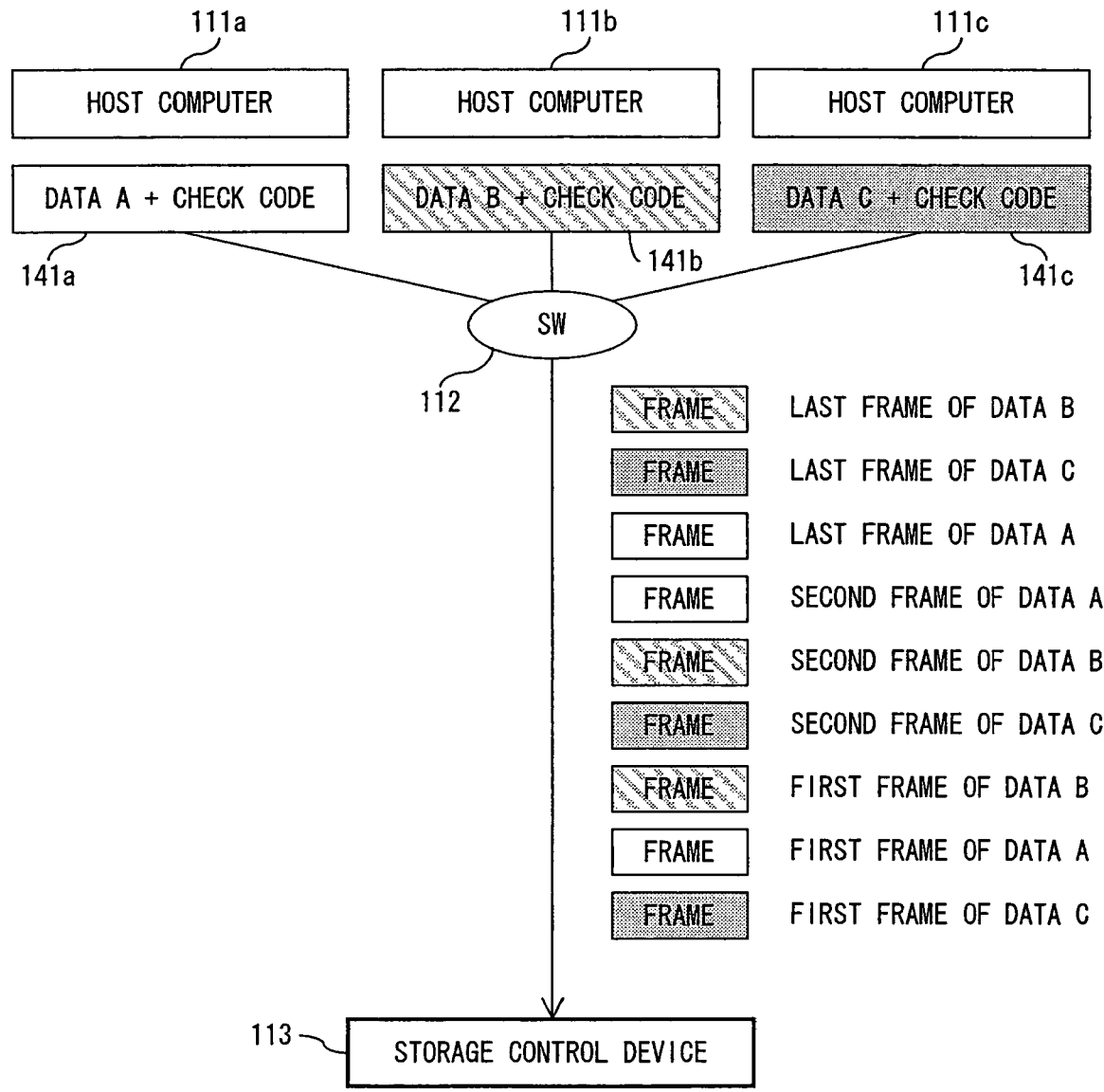
FIG. 1C shows the transfer of data from a plurality of host computers.

In the data processing device shown in FIG. 1B, the disk device is connected to the storage control device, but the present invention can apply to the storage control device connected to any other storage device such as a tape device. Included in the disk device are a magnetic disk device, optical disk device, magneto-optical disk device or the like.

What is claimed is:

1. A judgment apparatus which judges legitimacy of data included in each data block using a check code included in each data block when each of a plurality of data blocks is divided into a plurality of frames and divided frames are received from a host computer via a fiber channel of a communication network outside the judgment apparatus, comprising:

a group identifier storage device storing a group identifier of a data block corresponding to a frame received among a plurality of group identifiers allocated to the plurality of data blocks;

an interim result storage device having a plurality of entries which store interim calculation results of check codes of the data blocks in accordance with the respective group identifiers;

a data length storage device storing a data length of data stored in the frame received;

a buffer device storing the data stored in the frame received;

a buffer length update device updating the data length stored in the data length storage device when the data is read from the buffer device;

a production device producing an interim calculation result of a check code using an interim calculation result stored in an entry of the interim result storage device which corresponds to the group identifier stored in the group identifier storage device and the data stored in the buffer device, and updating the interim calculation result stored in the entry until the data length stored in the data length storage device reaches a prescribed value; and a comparison device comparing a final calculation result with a check code of a data block and outputting a comparison result when a last frame of the data block is received from the host computer via the fiber channel of the communication network outside the judgment apparatus and the production device produces the final calculation result of the check code of the data block using data of the last frame.

2. The judgment apparatus according to claim 1, wherein the production device repeats an operation for updating the interim calculation result stored in a corresponding entry of the interim result storage device every time a frame is received and updates, in parallel, interim calculation results of a plurality of entries in the interim result storage device.

3. The judgment apparatus according to claim 1, further composing a flag storage device storing a flag which indicates whether the frame received is the last frame of a data block, wherein when the flag does not indicate that the frame received is the last frame, the production device updates the interim calculation result stored in the entry of the interim result storage device;

when the flag indicates that the frame received is the last frame, the comparison device compares the final calculation result with the check code of the data block.

4. A storage control apparatus which judges legitimacy of data included in each data block when each of a plurality of data blocks is divided into a plurality of frames and divided frames are transmitted and controls transfer of the data to a storage device, comprising:

a receiving device receiving a frame transmitted from a host computer via a fiber channel of a communication network outside the storage control apparatus;

a control device allocating different group identifiers to the plurality of data blocks, analyzing information of a header part of the frame received, and allocating a group identifier of a data block corresponding to the frame;

a group identifier storage device storing the group identifier allocated to the frame received;

an interim result storage device having a plurality of entries which store interim calculation results of check codes of the plurality of data blocks in accordance with respective group identifiers;

a data length storage device storing the data stored in the frame received;

a buffer device storing the data stored in the frame received;

a data length update device updating the data length stored in the data length storage device when the data is read from the buffer device;

a production device producing an interim calculation result of a check code using an interim calculation result stored in an entry of the interim result storage device which corresponds to the group identifier stored in the group identifier storage device and the data stored in the buffer device, and updating the interim calculation result stored in the entry until the data length stored in the data length storage device reaches a prescribed value; and a comparison device comparing a final calculation result with a check code of a data block when a last frame of the data block is received from the host computer via the fiber channel of the communication network outside the storage control apparatus and the production device produces the final calculation result of the check code of the data block using data of the last frame of the data block and outputting a comparison result.

5. A storage apparatus which judges legitimacy of data included in each data block when each of a plurality of data blocks is divided into a plurality of frames and divided frames are transmitted from a plurality of access devices and stores the data, comprising:

a receiving device receiving a frame transmitted from a host computer via a fiber channel of a communication network outside the storage apparatus;

a control device allocating different group identifiers to a plurality of data blocks, analyzing information of a header part of the frame received, and allocating the group identifier of the data block corresponding to the frame;

a group identifier storage device storing the group identifier allocated to the frame received;

an interim result storage device having a plurality of entries which store interim calculation results of check codes of a plurality of data blocks in accordance with respective group identifiers;

a data length storage device storing a data length of data stored in the frame received;

a buffer device storing the data stored in the frame received;

a data length update device updating the data length stored in the data length storage device when the data is read from the buffer device;

a production device producing an interim calculation result of a check code using an interim calculation result stored in an entry of the interim result storage device which corresponds to the group identifier stored in the group identifier storage device and the data stored in the buffer device, and updating the interim calculation result stored in the entry until the data length stored in the data length storage device reaches a prescribed value;

a comparison device comparing a final calculation result with a check code of a data block when a last frame of the data block is received from the host computer via the fiber channel of the communication network outside the storage apparatus and the production device produces the last calculation result of the check code of the data block using data of the last frame of the data block and outputting a comparison result; and a storage device storing original data shared by the plurality access devices and built from data included in a plurality of frames of each data block.

6. A computer readable recording medium which records a program for a processor which judges legitimacy of data included in each data block using a check code included in each data block when each of a plurality of data blocks is divided into a plurality of frames and divided frames are transmitted, wherein the program directs the processor to perform:

storing information of a header part of a frame received in a storage device, analyzing the information of the header part, and judging whether the frame received from a host computer via a fiber channel of a communication network outside the processor is the first frame of a data block;

allocating a new group identifier to the frame received if the frame is the first frame, and allocating, to the frame, the same group identifier as a frame belonging to the same data block as the frame received if the frame is not the first frame;

storing a data length of data stored in the frame received, storing the data stored in the frame received, updating the data length stored when the data is read, calculating a check code of each data block while retaining interim calculation results of check codes of a plurality of data blocks in accordance with respective group identifiers and the data stored, updating the interim calculation results until the data length reaches a prescribed value, and transferring the allocated group identifier to a judgment apparatus which compares the check code calculated with a check code received when a last frame of the data block is received from the host computer via the fiber channel of the communication network outside the processor; and making sure of legitimacy of each data block based on a comparison result transferred from the judgment apparatus.

7. An apparatus, comprising:

a processor which judges legitimacy of data included in each data block using a check code included in each data block when each of a plurality of data blocks divided into a plurality of frames and the divided frames are transmitted, the processor performing:

storing information of a header part of a frame received in a storage device, analyzing the information of the header part, and judging whether the frame received from a host computer via a fiber channel of a communication network outside the apparatus is the first frame of a data block;

allocating a new group identifier to the frame received if the frame is the first frame, and allocating, to the frame, the same group identifier as a frame belonging to the same data block as the frame received if the frame is not the first frame;

storing a data length of data stored in the frame received, storing the data in the frame received, updating the data length stored when the data is read, calculating a check code of each data block while retaining interim calculation results of check codes of a plurality of data blocks in accordance with respective group identifiers and the data stored, updating the interim calculation results until the data length reaches a prescribed value, and transferring the allocated group identifier to a judgment apparatus which compares the check code calculated with a check code received when a last frame of the data block is received from the host computer via the fiber channel of the communication network with outside the apparatus; and making sure of legitimacy of each data block based on a comparison result transferred from the judgment apparatus.

8. A judgment method for judging legitimacy of data included in each data block using a check code included in each data block when each of a plurality of data blocks is divided into a plurality of frames and divided frames are transmitted, comprising:

every time a frame is received from a host computer via a fiber channel of a communication network separate from the judgment method, repeating an operation of analyzing information of a header part of the frame received, allocating to the frame a group identifier of a data block corresponding to the frame, storing the group identifier allocated to the frame received in a group identifier storage device, extracting an interim calculation result stored in an entry corresponding to the group identifier stored in the group identifier storage device from an interim result storage device having a plurality of entries which store interim calculation results of check codes of the plurality of data blocks according to respective group identifiers, storing a data length of data stored in the frame received, storing the data stored in the frame received, updating the data length stored when the data is read from the frame received, producing an interim calculation result of the check code using the extracted interim calculation result and the data stored, and updating the interim calculation result stored in the entry corresponding to the group identifier until the data length stored reaches a prescribed value; and comparing a final calculation result with a check code of a data block when the final calculation result of the check code of the data block is produced using data of the last frame of the data block when a last frame of the data block is received from the host computer via the fiber channel of the communication network separate from the judgment method.

9. A judgment apparatus which judges legitimacy of data included in each data block using a check code included in each data block when each of a plurality of data blocks is divided into a plurality of frames and divided frames are received from a host computer via a fiber channel of a communication network outside the judgment apparatus, comprising:

group identifier storage means for storing a group identifier of a data block corresponding to a frame received among a plurality of group identifiers allocated to the plurality of data blocks;

interim result storage means for having a plurality of entries which store interim calculation results of check codes of the data blocks in accordance with the respective group identifiers;

data length storage means for storing a data length of data stored in the frame received;

buffer means for storing the data stored in the frame received;

data length update means for updating the data length stored in the data length storage means when the data is read from the buffer means;

production means for producing an interim calculation result of a check code using an interim calculation result stored in an entry of the interim result storage means which corresponds to the group identifier stored in the group identifier storage means and the data stored in the buffer means, and updating the interim calculation result stored in the entry until the data length stored in the data length storage means reaches a prescribed value; and comparison means for comparing a final calculation result with a check code of a data block and outputting a comparison result when a last frame of the data block is received from the host computer via the fiber channel of the communication network outside the judgment apparatus and the production means produces the final calculation result of the check code of the data block using data of the last frame of the data block.

10. A check method for a data block received from a host computer via a fiber channel of a communication network separate from the check method in frames having a block check code in a last block frame, comprising:

assigning received frames of the data block to a group;

calculating an interim check code for the group as the frames are received from the host computer via the fiber channel of the communication network separate from the check method;

storing a data length of data of each of the frames received;

storing data stored in the frames;

updating the data length stored for each frame received as additional frames are read; and comparing the check code for the group to the block check code.

* * * * *

UNITED STATES PATENT AND TRADEMARK OFFICE
CERTIFICATE OF CORRECTION

PATENT NO. : 7,577,894 B2
APPLICATION NO. : 10/929675
DATED : August 18, 2009
INVENTOR(S) : Yoshihiko Takeda et al.

It is certified that error appears in the above-identified patent and that said Letters Patent is hereby corrected as shown below:

Column 16, Line 6, after "network" delete "with".

Signed and Sealed this

First Day of December, 2009

David J. Kappos
*Director of the United States Patent and Trademark Office*